United States Patent
Couvee et al.

(10) Patent No.: US 9,053,092 B2
(45) Date of Patent: Jun. 9, 2015

(54) SYSTEM AUTHORIZING DIRECT DATA TRANSFERS BETWEEN MEMORIES OF SEVERAL COMPONENTS OF THAT SYSTEM

(75) Inventors: Philippe Couvee, Villard Bonnot (FR); Jean-Vincent Ficet, La Chapelle Blanche (FR); Yann Kalemkarian, Grenoble (FR)

(73) Assignee: BULL SAS, Les Clayes Sous Bois (FR)

( * ) Notice: Subject to any disclaimer, the term of this patent is extended or adjusted under 35 U.S.C. 154(b) by 191 days.

(21) Appl. No.: 13/513,040

(22) PCT Filed: Nov. 24, 2010

(86) PCT No.: PCT/FR2010/052502
§ 371 (c)(1),
(2), (4) Date: May 31, 2012

(87) PCT Pub. No.: WO2011/067507
PCT Pub. Date: Jun. 9, 2011

(65) Prior Publication Data
US 2012/0239826 A1  Sep. 20, 2012

(30) Foreign Application Priority Data

Dec. 1, 2009 (FR) .................................... 09 05777

(51) Int. Cl.
*G06F 3/00* (2006.01)
*G06F 13/28* (2006.01)
*G06F 13/40* (2006.01)

(52) U.S. Cl.
CPC ............ *G06F 13/28* (2013.01); *G06F 13/4022* (2013.01); *Y02B 60/1228* (2013.01); *Y02B 60/1235* (2013.01)

(58) Field of Classification Search
USPC .......................................................... 710/5
See application file for complete search history.

(56) References Cited

U.S. PATENT DOCUMENTS

| 7,849,235 B2 * | 12/2010 | Ihara et al. ...................... 710/22 |
| 2007/0162645 A1 | 7/2007 | Han et al. |
| 2008/0256352 A1 * | 10/2008 | Chow et al. ....................... 713/2 |

FOREIGN PATENT DOCUMENTS

| EP | 1313023 | 5/2003 |
| EP | 1557764 | 7/2005 |

(Continued)

OTHER PUBLICATIONS

PCT International Search Report for PCT Application No. PCT/FR2010/052502, mailed Apr. 8, 2011.

(Continued)

*Primary Examiner* — Chun-Kuan Lee
(74) *Attorney, Agent, or Firm* — Pillsbury Winthrop Shaw Pittman LLP (57) ABSTRACT

The invention relates in particular to a computer system including peripheral devices (600) and at least one switch (605) connected to each device. A first device includes a means for initiating a control of direct access to memory areas, each one of which is associated with a separate element of the system. The switch includes a means for transmitting at least a portion of the control to each element. At least one element comprises a second device including a means for receiving at least one control of direct access to a memory area of said second device, said control being received from said first device via said switch, and a means for transmitting said received control to a component of said second device. Said system allows said first device to perform a direct data transfer to or from a memory of said first peripheral device from or to each element.

16 Claims, 4 Drawing Sheets (56) References Cited

FOREIGN PATENT DOCUMENTS

| JP | 02-207363 | 8/1990 |
| JP | 05-265923 | 10/1993 |
| WO | WO 2006/114822 A1 | 11/2006 |
| WO | WO 2009/077341 | 6/2009 |

OTHER PUBLICATIONS

Japan Patent Office, Office Action, dated Dec. 11, 2013, for Japanese Patent Application No. 2012-541556, filed Nov. 1, 2013 which shares priority of French Patent Application No. 0905777, filed Dec. 1, 2009 with captioned U.S. Appl. No. 13/513,040, and cites the above-identified references numbered 1-4. A Google Machine Translation is provided.

* cited by examiner

SYSTEM AUTHORIZING DIRECT DATA TRANSFERS BETWEEN MEMORIES OF SEVERAL COMPONENTS OF THAT SYSTEM

CROSS-REFERENCE TO RELATED APPLICATIONS

This application is a U.S. National Phase under 35 U.S.C. §371 of International Application PCT/FR2010/052502, filed Nov. 24, 2010, which designated the U.S., and which claims priority under 35 U.S.C. §119 to French Patent Application Number 0905777, filed on Dec. 1, 2009. The disclosures of the above-described applications are hereby expressly incorporated by reference in their entireties.

The present invention concerns the transfer of data between at least some areas of memories of a computer system and more particularly a system authorizing direct data transfers between memories of several components of that system among which are one or more peripheral devices.

Modern computer systems frequently integrate mechanisms for direct access to a central memory by input/output systems also called peripheral devices. These mechanisms are commonly called DMA type controllers (DMA standing for Direct Memory Access).

According to this data sending mechanism, a peripheral device such as a network card or a hard disk interface may itself perform a data transfer between an internal memory of that device and a central memory situated externally to it, without intervention by the processor or processors, these latter merely sending a reading or writing command comprising a start address of the memory area to transfer and the length of that area. The data transfer may be carried out from an internal memory to an external memory and vice-versa.

DMA type controllers are in particular used in multitask computer systems using fast peripheral devices in order not to lead to blockage during the data transfers. They behave like initiators of reading or writing requests for transferring data from an internal memory of a peripheral device to a central memory and vice-versa.

Furthermore, DMA type controllers make it possible to protect the internal memory of a peripheral device by preventing direct access thereto.

Figure 1:
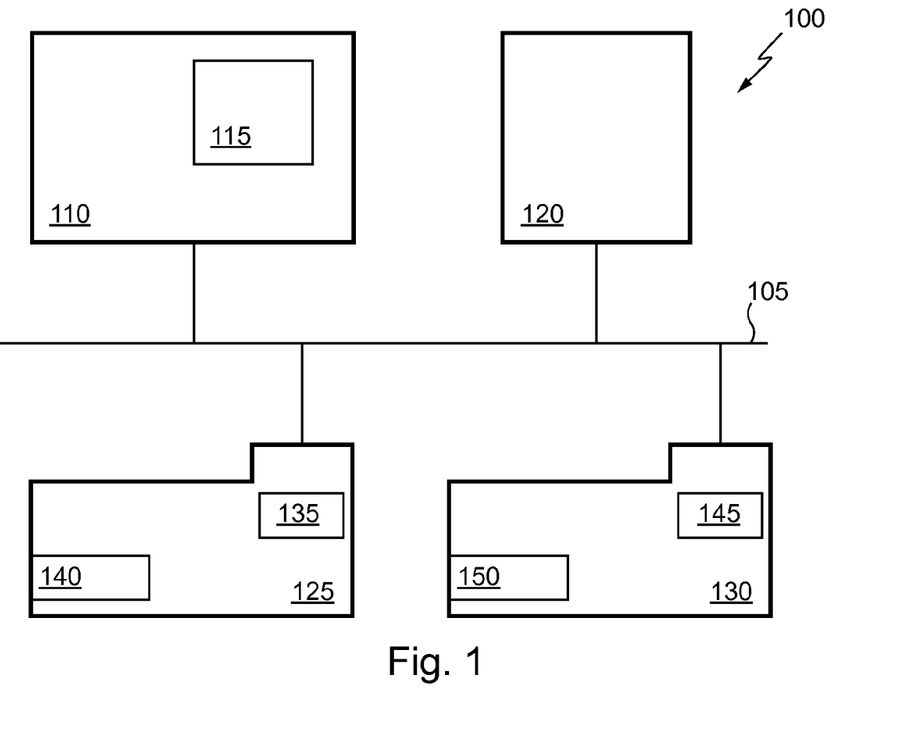
FIG. 1 diagrammatically illustrates a computer system comprising two peripheral devices each equipped with a DMA type controller.

FIG. 1 diagrammatically illustrates a computer system comprising two peripheral devices each equipped with a DMA type controller.

As illustrated, the computer system 100 comprises an input/output bus 105 to which are connected a mother board 110 integrating one or more processors 115, a central memory 120 and network cards 125 and 130. Although their illustration is simplified in FIG. 1, the computer system 100 comprises not only the hardware components represented but also software applications such as firmware enabling the implementation of the system. The network card 125 comprises a DMA type controller 135 enabling data to be exchanged between the central memory 120 and the network interface 140 via the bus 105. Similarly, the network card 130 comprises a DMA type controller 145 enabling data to be exchanged between the central memory 120 and the interface 150 via the bus 105.

Thus, for example, when the network interface 140 receives data from the network, the DMA type controller 135 initiates a request to write in the memory 120 to transfer thereto the received data stored locally in a buffer memory (not represented). Similarly, when the DMA type controller 135 receives a reading request from a processor 115 to send data via the network, it initiates a reading request to read data in the memory 120 and transfer them to the interface 140.

In the same way, the DMA type controller 145 enables data to be exchanged between the memory 120 and a network to which the card 130 is connected.

However, whereas the DMA type controllers have proved their effectiveness in numerous architectures, there is a continuous need to improve the performance of computer systems, in particular HPC type computer systems (HPC standing for High-performance computing).

The invention is thus directed, in particular, to improving the systems implementing direct memory access controllers to enable direct data transfers between memories of several components of that system, in particular between memories of several peripheral devices.

The invention thus relates to a computer system comprising a plurality of peripheral devices and at least one switch connected to each device of said plurality of peripheral devices, said switch comprising means for transferring a command to a plurality of components of said computer system, in which, at least one device of said plurality of peripheral devices, referred to as at least a first peripheral device, comprises means for initiating at least one command for direct access to a plurality of memory areas, each of said memory areas being associated with a distinct component of said plurality of components;

said switch comprises means for sending at least a part of said at least one command to each component of said plurality of components;

at least one component of said plurality of components consists of at least one device of said plurality of peripheral devices, referred to as at least one second peripheral device, said at least one second peripheral device comprising the following means;

means for receiving at least one command for direct access to an area of a memory of said second peripheral device, said command being received from said at least a first peripheral device via said switch; and, means for sending said at least one received direct access command to a component of said second peripheral device, said system enabling said at least a first device to perform a direct transfer of at least one item of data to or from a memory of said at least a first peripheral device from or to each component of said plurality of components on the basis of a single command.

The system according to the invention thus enables direct transfers of data to be made between memories of several components of the system, among which are one or more peripheral devices, in order to reduce the quantity of central memory used in the computer system, to free the central processor of certain data transfer tasks and to reduce the latency due to the reading/writing operations. The system furthermore makes it possible to meet needs for equipment redundancy, in particular in fields such as telecommunications or finance which use equipment of 5-9 type, that is to say equipment whose calculated reliability is 99.99999%. The system according to the invention furthermore makes it possible to improve the performance of systems by aggregating data streams, for example to graphics devices, in particular in the HPC field and in viewing, in which streams for computation may converge to graphics memories to enable them to be processed.

According to a particular embodiment, said at least a first device comprises means for performing at least one operation on at least one item of data among data received from said plurality of components in response to said at least one command. The system according to the invention thus makes it possible to process certain items of data at the time of their transfer for optimization purposes. These operations are, for example, logic operations, mathematical operations, sorting operations, coding operations or aggregation operations.

Advantageously, said means for performing said at least one operation comprise means for identifying said at least one operation according to at least one item of data among data received from said plurality of components in response to said at least one command to identify in simple manner the operation or operations to perform.

Still according to a particular embodiment, at least one component of said plurality of components comprises a central memory of said computer system. The system according to the invention thus enables a direct transfer of data simultaneously to or from the central memory as well as to or from one or more peripheral devices.

Said at least one second peripheral device further comprises, preferably, means for checking the validity of said at least one part of said at least one command in order to protect the memory of said at least one second device against unauthorized accesses.

Advantageously, said checking means comprise means for comparing an identifier of the sender of said at least one direct access command with at least one predetermined identifier. Thus, only the authorized peripheral devices can directly access a memory of said at least one second peripheral device.

Still advantageously, said checking means comprise means for comparing said area of a memory of said second peripheral device with at least one predetermined memory area. Thus, it is possible to protect areas of memory of said at least one second peripheral device in order that none or only some peripheral devices can have access thereto.

According to a particular embodiment, said means of said at least one second device for sending said at least one direct access command received from a component of said second peripheral device comprise means for performing at least one operation on at least one item of data received. The system according to the invention thus makes it possible to process certain items of data at the time of their transfer for optimization purposes.

Still according to a particular embodiment, said at least a first peripheral device further comprises means for identifying said at least one second peripheral device and means for sending a command for direct access to an area of a memory of said second device when the memory concerned by the direct access command coming from said initiating means belongs to said at least one second peripheral device. Said at least a first peripheral device may thus identify said at least one second peripheral device and initiate a direct transfer of data between a memory of said at least a first peripheral device and at least one memory of said at least one second peripheral device.

Other advantages, objects and features of the present invention will emerge from the following detailed description, given by way of non-limiting example, relative to the accompanying drawings in which:

FIGS. 6a to 6g presents examples of direct sending of data between several peripheral devices, during which operations may be carried out on the transferred data.

In general terms, the invention is directed to enabling the direct sending of data between memories of peripheral devices provided with DMA type controllers without necessitating steps of writing followed by steps of reading in a central memory. In other words, the invention enables the implementation of a mechanism for dialog between DMA type controllers enabling them to platform transactions for which a DMA type controller is the initiator and at least one other DMA type controller behaves as a target while performing the final part of the data transfer into the peripheral device considered.

Thus, by way of illustration and with reference to FIG. 1, data received by the network interface 140 of the network card 125 may be directly transferred into the interface 150 of the card 130 without using the central memory 120.

A direct communication between several peripheral devices has numerous advantages in particular in the context of high performance scientific computation, especially between graphics cards or GPUs (standing for Graphics Processing Units) and Infiniband cards, between Infiniband cards and Ethernet cards and between Infiniband cards.

In particular, it is observed that an increasing number of computing centers use graphics cards in order to perform computations which were conventionally carried out by computing units of the nodes, the greater power of the graphics cards making it possible to reduce the physical footprint of the system. In order to perform the computations in parallel, an interconnection network is required. By enabling a direct transfer of the data from the network to graphics cards and vice-versa, without requiring central memory, the nodes implemented require less memory, which makes it possible to reduce the electrical consumption while reducing the overall cost of the computer. The same applies to the transfer of data between internal and external networks. Furthermore, the direct transfer of data enables frequently encountered problems of non-uniform memory access and of location to be overcome.

The implementation of the invention is linked, in particular, to the architecture of the transfer buses used between the peripheral devices and to the memory architecture of the different devices involved. It may be made at the level of the hardware or at the level of the software embedded in the device, preferably using a predetermined protocol which, advantageously, enables the following functions to be performed, the identification of a peripheral device comprising a DMA type controller capable of initiating a direct transfer of data between DMA type controllers and of behaving like a target to perform the final part of a data transfer;

the declaration of memory areas that can be used for directly transferring data between DMA type controllers, that is to say from memory areas controlled by a DMA type controller and that are accessible by other DMA type controllers;

the definition of rules for data transfer from a memory of a peripheral device comprising a DMA type controller capable of implementing the invention to other similar ones, in particular rules for direct or programmed data transfers; and, the control of peripheral devices comprising a DMA type controller capable of implementing the invention to make it possible to automate the transfer of data stored in a memory of such a device to other similar ones.

Figure 2:
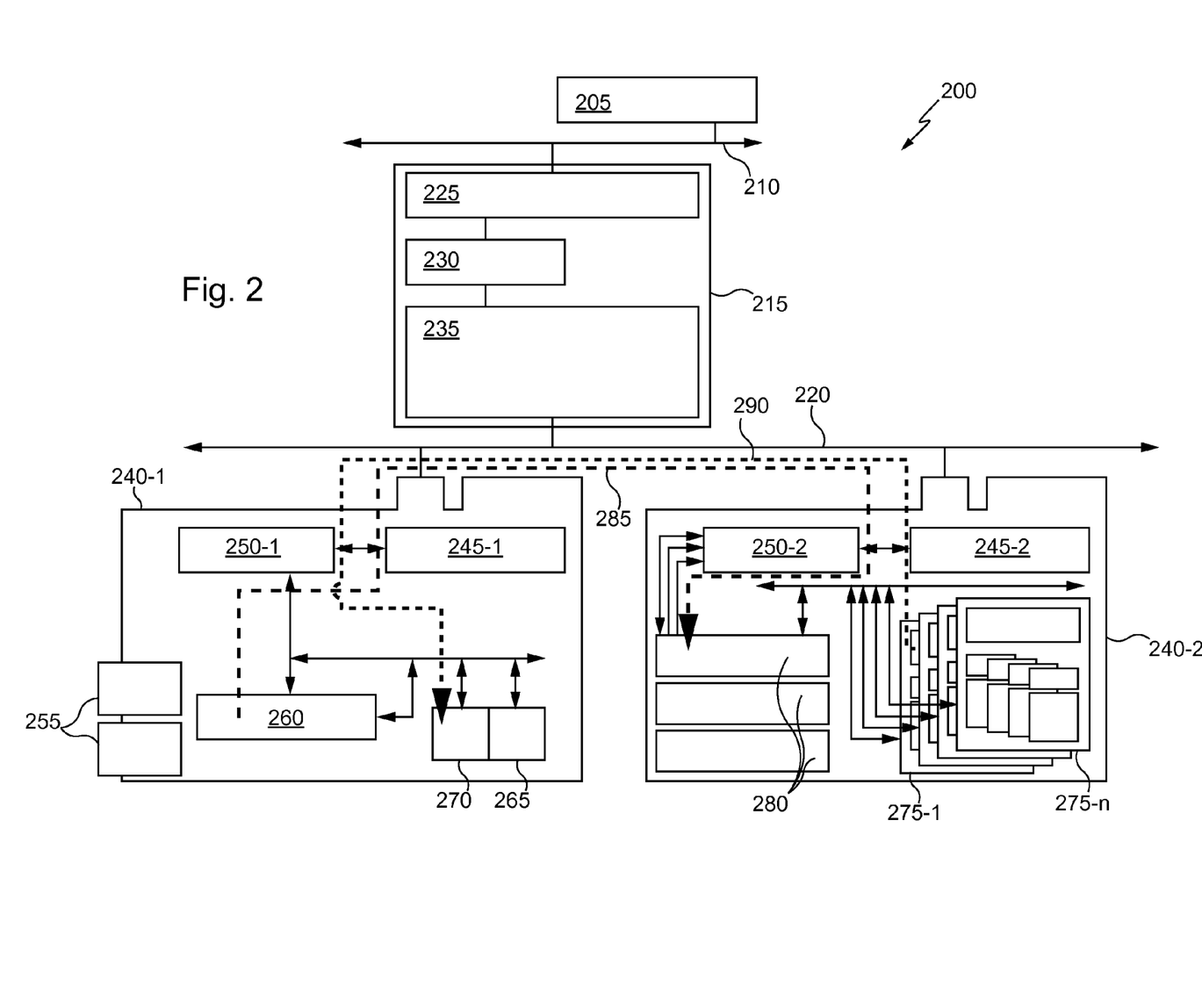
FIG. 2 diagrammatically illustrates certain components of a computer system in which the invention may be implemented.

FIG. 2 diagrammatically illustrates certain components of a computer system 200 in which the invention may be implemented. The system comprises here a central memory 205 linked to a system bus 210 called host CPU to which is also linked the bus controller 215. A particular object of the latter is to convert and transfer information from the system bus 210 to a peripheral bus 220. For these purposes, the bus controller 215 comprises a system bus interface 225, a data interface 230 and a peripheral bus interface 235.

The computer system 200 further comprises two peripheral devices 240-1 and 240-2 connected to the peripheral bus 220.

The peripheral device 240-1 here is a network card, for example an Ethernet card. It comprises a peripheral bus interface 245-1 and an associated processing unit 250-1 for processing the data packets exchanged via that peripheral bus interface. It further comprises a network interface 255 and an associated processing unit 260 for processing the data packets exchanged via that network interface. Furthermore, the peripheral device 240-1 comprises a central processing unit (or CPU) 265 and a local memory 270, for example of SRAM type (SRAM being an acronym for Static Random Access Memory).

Similarly, the peripheral device 240-2, here a graphics card, comprises a peripheral bus interface 245-2 and an associated processing unit 250-2 for processing the data packets exchanged via that peripheral bus interface. This device further comprises a plurality of computing units 275-1 to 275-$n$ each comprising a shared memory, a local memory and an elementary computing unit. This device also comprises memories 280 common to all the computing units, for example a general memory and a texture memory.

The interfaces 245-1 and 245-2 integrate a DMA type controller enabling direct data transfers between the central memory 205 via the bus controller 215 and an internal memory of the peripheral devices 240-1 and 240-2 and vice-versa.

These DMA type controllers furthermore integrate functions enabling data to be directly transferred between internal memories of those devices. By way of illustration, it is possible to transfer data from a buffer memory of the processing unit 260 of the device 240-1 to a memory 280 of the device 240-2 as illustrated by the arrow 285. Similarly, it is possible to transfer data from a shared memory of a computing unit 275-$i$ of the device 240-2 to the local memory 270 of the device 240-1 as illustrated by the arrow 290.

For these purposes and as described earlier, the DMA type controllers here comprise functions for identification, declaration, configuration and control.

Figure 3:
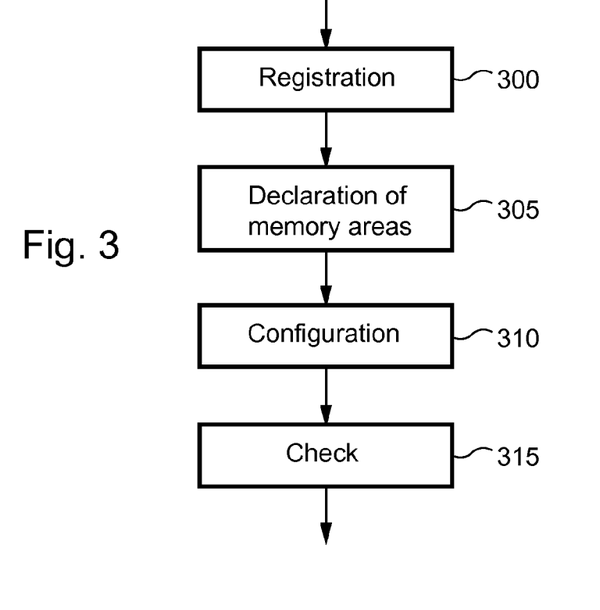
FIG. 3 diagrammatically illustrates phases implemented in a DMA type controller of a particular peripheral device to enable the direct transfer of data between peripheral devices.

FIG. 3 diagrammatically illustrates an example of sequencing of the phases implemented in such a DMA type controller of a particular peripheral device. It is noted here that the phases represented in FIG. 3 are not necessarily executed sequentially and that they may be executed in a different order to that represented. In particular, the control phase may follow the registration phase.

An object of a first phase (phase 300) is the registration of the peripheral device in order for it to be identifiable by the other devices which are directly linked to it. This registration may, for example, be carried out in a common directory. This phase may in particular be automatically executed when the device is activated. The registration phase further comprises, preferably, a step of describing the device in particular in order to define the type thereof. It is noted here that the type may be defined in similar manner to the typology implemented in the PCI-E standard (PCI-E standing for Peripheral Component Interconnect Express). This description may also define other features specific to the peripheral device, in particular the following features given by way of illustration, an internal memory capacity of the device;

a credit to control a data stream in order to avoid unnecessary traffic (the sending of each command for access to an external memory uses one unit of credit which is again available when an acknowledgement of receipt is received in response to the command);

an indication of security to protect the access to the data of an internal memory of the device, when writing and/or when reading, for example based on a coding key mechanism;

an indication of integrity checking to specify whether the data exchanged comprise check data such as CRC data (CRC standing for Cyclic Redundancy Check).

a speed of consumption of the data stored in an internal memory of the device. This indication makes it possible in particular to verify the compatibility of two peripheral devices implementing DMA type controllers implementing the invention; and, the list of the operations supported by the device.

This phase may also be used to identify other peripheral devices linked to the same bus as the device considered, in particular devices comprising a DMA type controller in accordance with the invention, in order to establish the list of the peripheral devices with which the device considered may directly exchange data.

After having registered itself, the DMA controller of the device may initiate a memory area declaring phase (phase 305). A function executed in this phase is directed in particular to the declaration of the internal memory areas of the device in which other devices may read and/or write data, which may be subject to certain conditions. Advantageously, such a declaration is made in the common directory used to identify the peripheral devices linked to the same bus.

During this phase, it is also possible to execute functions of the DMA type controller to search in a common directory for the sections of memory declared in advance by other peripheral devices. Furthermore, tools making it possible to establish relationships between internal memory areas of the device and internal memory areas of other devices may be implemented to establish source/destination links.

In a following phase (phase 310), the device may be configured to enable the direct transfer of data to or from other peripheral devices, that is to say to set data transfer rules. During this phase, an evaluation step is advantageously executed in a test period to evaluate the compatibility, in particular in terms of services and speed, of the device considered with other peripheral devices which are linked to it.

This phase is also directed to creating primitives for transfer in point-to-point mode by specifying the devices involved, the memory areas concerned and the possible data sending parameters such as security and integrity checking. It is noted here that an object of creating primitives is the definition of read and/or write commands but not their execution which is carried out when conditions are satisfied for example when an item of data is written in internal memory or on request of a user or an application.

By way of illustration, such a primitive may, with reference to the device 240-2 of FIG. 2, be directed to a command for writing data coming from a shared memory of a computing unit 275-*i* to the local memory 270 of the device 240-1 (arrow 290). It may also be a command for reading data from a buffer memory of the processing unit 260 of the device 240-1 to a memory 280 (arrow 285).

By way of illustration, they may be represented in the following form, reading(source, destination, length, parameters)

in which the indications of source and of destination comprise the identifiers of the peripheral devices and of the memories considered as well as the memory areas concerned, the length indicates the quantity of data to transfer and the parameters concern the parameters to be used which are linked, for example, to security, to the checking of data and to the execution of the command corresponding to the primitive.

Primitives may also be created for the sending of data in a collective mode of multicast or broadcast type which enables data to be transferred from a common source to several different devices as described below, in particular with reference to FIG. 6. Such a transfer mode is particularly useful when devices are duplicated to increase the reliability of the computer system.

They may also comprise operations of grouping or ungrouping of data coming from or destined for memories of several peripheral devices making it possible to improve the performance of the computer system. Such operations may be considered as extensions of the operations known under the name of scatter and gather whereby DMA type controllers are capable of grouping data from a memory to make a single exchange of a large amount of data.

The execution of the commands corresponding to those primitives may be explicit (according to the commands by users or from the kernel of the operating system), may be predetermined according to events (for example an item of data may be the subject of a writing command when it is received in memory), or may be periodic (the transfers are planned, that is to say that the content of the memory is transferred, in whole or in part, according to predetermined time cycles).

Lastly, a control phase may be performed (phase 315) to enable a user to access the peripheral device. This access is, preferably, performed via an interface. It makes it possible here to obtain the version and the capabilities of a device as well as to configure it. It also makes it possible to declare areas of an internal memory of the device that are accessible to other devices and/or to define rules about such memory areas to indicate, for example, who may access those areas and with what operations and using what transfer modes.

Figure 4:
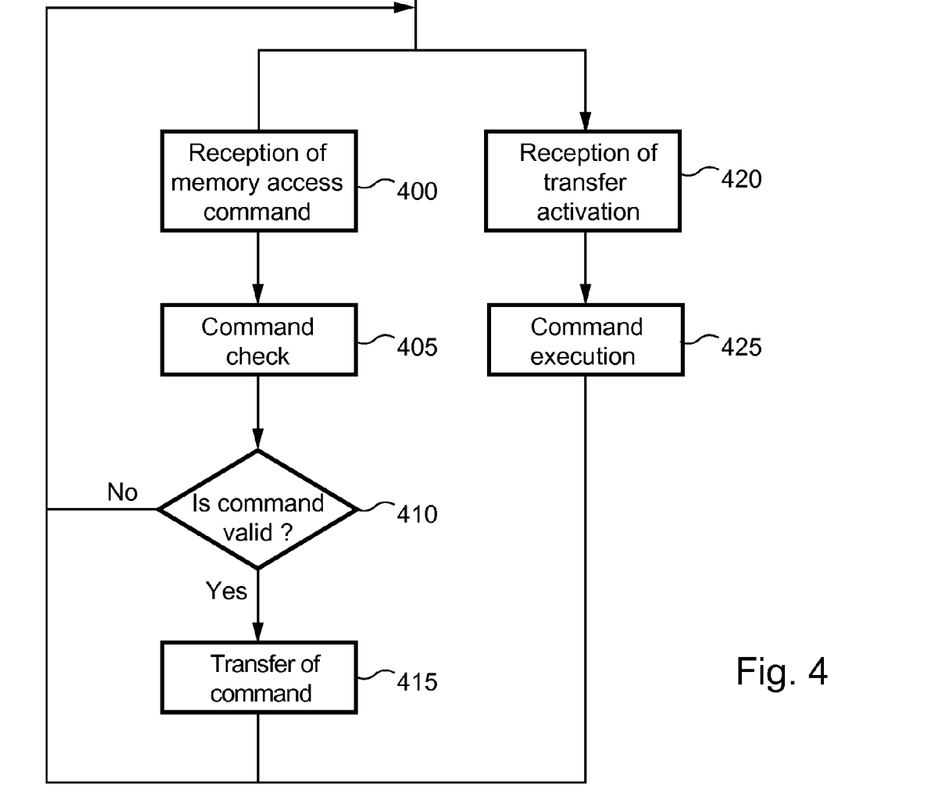
FIG. 4 diagrammatically illustrates certain steps performed in a DMA type controller conforming to the invention to directly transfer data between several peripheral devices.

FIG. 4 diagrammatically illustrates certain steps performed in a DMA type controller conforming to the invention to directly transfer data between several peripheral devices.

After having received a command for access to an internal memory of the device comprising the DMA type controller (step 400), for example a command for reading or writing, a check of the received command is, preferably, performed (step 405). Such a check is in particular to protect the internal memory of the device that received the command. As stated earlier, such a check may in particular concern the initiator of the command and the memory area which is the subject of the command. A test is then carried out (step 410) to determine whether the command is valid, that is to say here whether the initiator of the command has the right to access the internal memory of the device that received the command and more particularly the memory area specified in the command.

If the command is not valid, the command is rejected. An error message may then be sent to the initiator of the request (not shown). If, on the contrary, the command is valid, it is sent to another component of the device comprising the DMA type controller that received the command (step 415), typically a memory controller. The command is then executed in standard manner.

In parallel, when the DMA type controller receives a notification of activation of data transfer (step 420), it executes the corresponding command in standard manner. The data transfer activation notification may be received from a component of the device comprising the DMA controller, for example a network interface, or from an external component, in particular processors of the central system of the computer system. It is noted that the transfer may here concern a command for reading or writing from or to the central memory of the computer system but also from or to one or more peripheral devices which then perform steps similar to steps 400 to 415 described earlier.

In other words, the DMA type controller here has a twin function of conventional DMA type controller (steps 420 and 425) and of bridge enabling a command to be transferred from an external peripheral device to an internal component of the peripheral device comprising the DMA type controller which thus simulates a behavior of a memory controller vis-à-vis the external peripheral device (steps 400 to 415).

As previously indicated, the DMA type controllers adapted to implement the invention may be used for collective transfers, that is to say multipoint data transfers.

Figure 5:
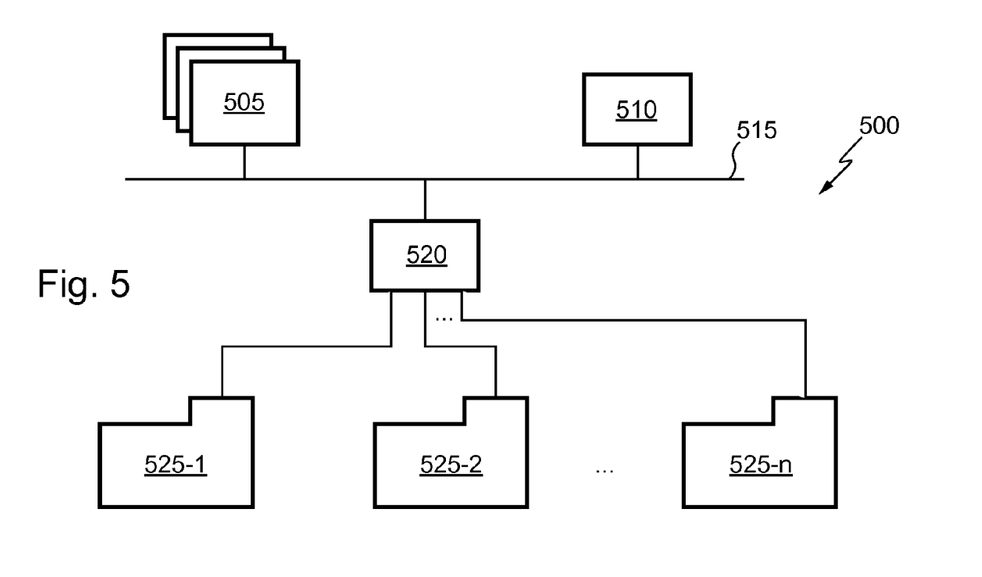
FIG. 5 illustrates a computer system adapted to perform data transfers in multipoint mode; and, FIG. 6, comprising

FIG. 5 illustrates a computer system 500 adapted to perform direct data transfers in multipoint mode. The computer system 500 here comprises processors 505 and a central memory 510 linked by a system bus 515. The system 500 further comprises a bus switch 520 also linked to the system bus 515 as well as a plurality of peripheral devices 525-1 to 525-*n*.

The bus switch 520 is, for example, a PCI-E switch which is connected to the devices 525-1 to 525-*n* in point-to-point mode, independently, according to a full-duplex link, attributing bus widths according to the exchanges that are initiated by the DMA controllers of the peripheral devices.

It is noted here that in one specification the PCI-SIG standard provides for the possibility of making PCI-E exchanges of multicast type by implementing a suitable protocol in the DMA controller of a PCI-E switch to enable direct transfers of data between the central memory and peripheral devices grouped together in multicast group form.

There are for example PCI-E switches with 16 lanes comprising up to 4 DMA type controllers to perform direct data transfers according to descriptors that are specially dedicated to multicast exchange. These descriptors indicate a common source for each of the multicast type controllers which are aimed at different targets, thereby enabling multiple exchanges. These descriptors may also indicate whether interrupts have to be generated for each DMA type controller or only at the end of the multicast transfer.

Such switches may be used to implement the invention as described earlier and thus enable the direct transfer of data between peripheral devices grouped in multicast group form, each of those devices comprising a DMA type controller performing the functions described earlier.

They thus enable data exchanges on the basis of collective transfer primitives, that is to say in a dialog with (n+1) participants.

Several operations are possible between peripheral devices provided with DMA type controllers in accordance with the specifications described previously and between peripheral devices provided with DMA type controllers in accordance with the specifications described previously and the central memory.

Examples of such operations are illustrated with reference to FIG. 6, comprising FIGS. 6a to 6g.

The peripheral devices 600-1 to 600-4 represented each comprise a DMA type controller in accordance with the specifications described previously. Each of these devices is linked here to a switch 605 adapted to manage collective transfers (multicast and broadcast).

Figure 6A:
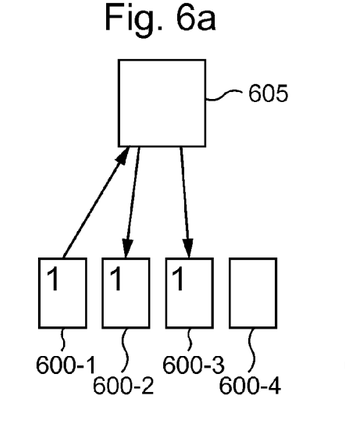

FIG. 6a illustrates multicast type sending from device 600-1 to devices 600-2 and 600-3. The dissemination of data is thus carried out from a source to several targets of the multicast group to which device 600-1 belongs. This is a communication of type 1 to n initiated by the device comprising the transferred item of data.

Figure 6B:
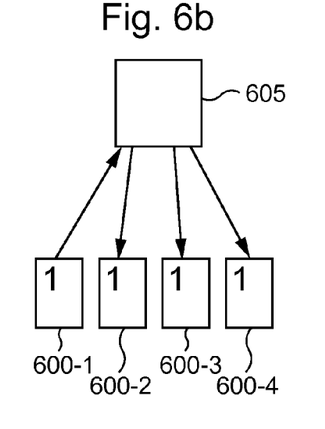

FIG. 6b illustrates broadcast type sending from device 600-1 to devices 600-2, 600-3 and 600-4. The dissemination of data is thus carried out from a source to all the targets of the multicast group to which device 600-1 belongs. This is a communication of type 1 to all initiated by the device comprising the transferred item of data.

Figure 6C:
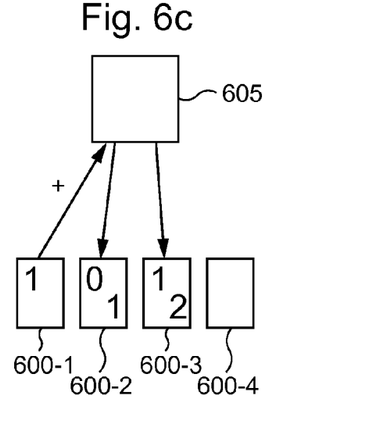

FIG. 6c illustrates computed multicast type sending from device 600-1 to devices 600-2, 600-3 and 600-4. The dissemination of data is thus carried out from a source to all the targets of the multicast group to which device 600-1 belongs. Furthermore, an operation is carried out on the transferred data, for example a logic operation such as an "or", an "and" or an "exclusive or", a mathematical operation such as an addition or a multiplication or an operation defined by the device such as an operation of sorting or encrypting data. The operation carried out here is an addition between the transferred data and an item of data present in the target device. The sending is initiated by the device comprising the transferred item of data.

Figure 6D:
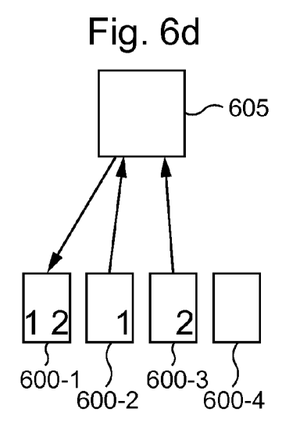

FIG. 6d illustrates data sending of aggregation type from devices 600-2 and 600-3 to device 600-1. This is an operation which, from several sources, makes it possible to send data to one or more targets by aggregating the data sent. The sending is initiated by the device receiving the transferred data.

Figure 6E:
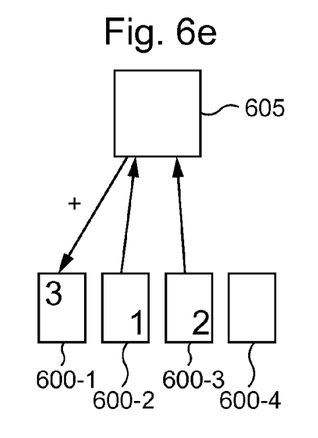

FIG. 6e illustrates data sending of computed aggregation type from devices 600-2 and 600-3 to device 600-1. This is an operation which, from several sources, makes it possible to send data to a target by performing a computation on the data sent. This is an addition here between the data received from the sources used. The sending is initiated by the device receiving the transferred data. Naturally, other types of operations may be performed.

Figure 6F:
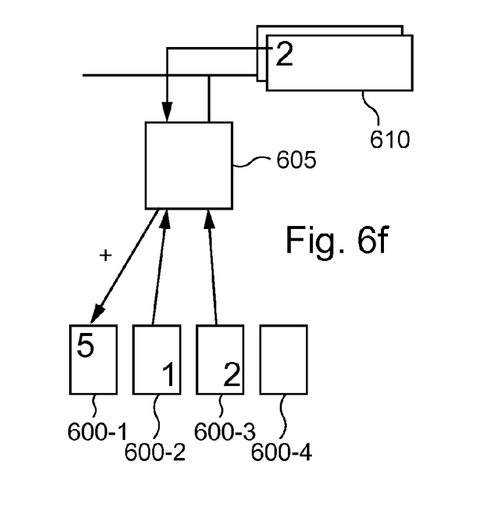

FIG. 6f illustrates data sending of computed aggregation type from devices 600-2 and 600-3 and from the central memory 610 to device 600-1. This is an operation which, from several sources, makes it possible to send data to a target by performing a computation on the data sent. This is an addition here between the data received from the sources used. The sending is initiated by the device receiving the transferred data. Other types of operations may also be performed.

Figure 6G:
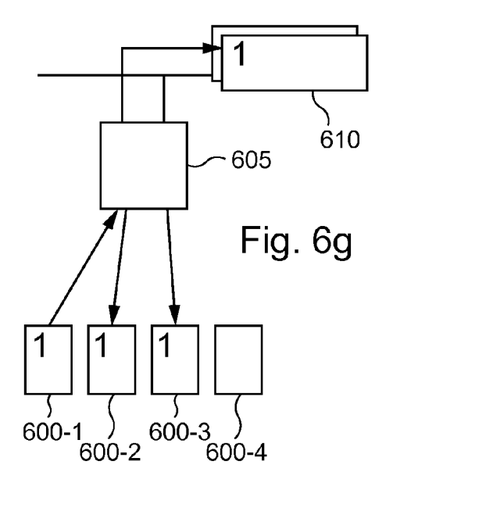

FIG. 6g illustrates multicast type sending from device 600-1 to the devices 600-2 and 600-3 and the central memory 610. The dissemination of data is thus carried out from a source to several targets of the multicast group to which device 600-1 belongs. This is a communication of type 1 to n. The sending is initiated by the device comprising the transferred item of data.

It is thus in particular possible to perform the following operations at the time of the direct and collective sending of data, dissemination: data coming from a source are sent to several or to all the other peripheral devices belonging to the same group, and it is also possible for them to be sent to the central memory;

dissemination with operation: the coming from a source are sent to several or to all the other peripheral devices belonging to the same group and it is also possible for them to be sent to the central memory, by performing operations on the those data, in particular logic type operations such as an "or" an "and" and an "exclusive or", mathematical operations such as additions and multiplications and operations defined by the target device or devices such as an operation of sorting or encryption of the data;

aggregation: data coming from several sources are aggregated and sent to one, several or all the other peripheral devices belonging to the same group, and it is also possible for them to be sent to the central memory; and aggregation with operations: operations are carried out on data coming from several sources, the results of these operations being sent to one, several or all the other peripheral devices belonging to the same group and it is also possible for them to be sent to the central memory. Such operations are in particular operations of logic type such as an "or", an "and" and an "exclusive or", mathematical operations such as additions and multiplications and operations defined by the target device or devices such as an operation of sorting or encryption of the data.

According to a particular embodiment, the choice of the operation to be carried out depends on some of the data received in response to a command for reading data.

Direct transfers of data between several peripheral devices, or collective transfers, may be performed using primitives for collective transfers determined in at least one of the peripheral devices.

This implementation is similar to that described earlier. It comprises phases of identification, declaration, configuration and controlling. The parameters of the primitives for collective transfers are, preferably, similar to those of the primitives used for performing a direct transfer of data between memories of two peripheral devices as described earlier. However, they furthermore comprise specific features linked in particular to the operations of combining data.

An example of such a collective transfer primitive may be represented in the following form, read(source_1, destination_1, length_1, . . . , source_n, destination_n, length_n, parameters)

where, source_i and destination_i comprise the identifiers of the peripheral devices and memories considered as well as the memory areas concerned. According to the nature of the primitive, all the sources or all the destinations concern the same device and identical or distinct memory areas such that the same item of data can be transferred to several devices and such that data coming from different devices can be transferred into different memory areas of a device or into the same area after an operation has been carried out;

length_i indicates the quantity of data to transfer from the source_i to destination_i; and, parameters specify the parameters to be used that are linked, for example to security, to the checking of the data, to the operations to be carried out and to the execution of the command corresponding to the primitive.

When particular operations have to be carried out on transferred data, they are carried out by the device that initiated the command at step 425 illustrated in FIG. 4 or by a device that received the command at step 415 illustrated in FIG. 4 according to the information from the primitive at the origin of the direct access command.

Thus, for example, with reference to FIG. 6e, after having initiated a command to access data stored in devices 600-2 and 600-3, the device 600-1 waits to receive the transferred data then carries out the operation specified in the primitive. Step 425 described earlier then comprises a step for initiating the command for direct access to the memory of other devices, a synchronizing step to obtain the awaited data and a step directed to the execution of the operations specified in the primitive linked to the activated transfer.

Similarly, with reference, for example, to FIG. 6c, when a direct access command is initiated according to a primitive indicating the execution of an operation in another device, distinct from the device at the origin of that command, an indication relative to the operations to perform is added to the direct access command sent to that other device. When such a command is received by a DMA type controller and is valid, the operations to perform are identified by the DMA according to the indications received. It then initiates their execution before sending the command in order for it to be executed during step 415.

Naturally, to satisfy specific needs, a person skilled in the art will be able to make amendments to the preceding description.

The invention claimed is:

1. A computer system, comprising:
a plurality of peripheral devices; and
at least one switch connected to each of the peripheral devices, wherein the switch is configured to transfer a command to a plurality of elements, the plurality of elements comprising at least the peripheral devices,
wherein a first of the peripheral devices is configured to initiate at least one command for direct access to a plurality of memory areas, each of the memory areas being associated with a distinct element of the plurality of elements,
wherein the switch is configured to send at least a part of the at least one command to one or more of the elements,
wherein at least one of the elements consists of a second of the peripheral devices, wherein the second peripheral device comprises:
a local memory, and
a controller configured to receive the at least one command, wherein the command is for direct access to the local memory, wherein the command is received from the first peripheral device via the switch, and wherein the controller is also configured to send the received command to a component of the second peripheral device, wherein the controller is configured to check the validity of the command and compare an area of a memory of the second peripheral device with at least one predetermined memory area,
wherein the computer system enables the first peripheral device to perform a direct transfer of at least one item of data to or from a memory of the at least first peripheral device from or to each of the elements, except from or to the first device, on the basis of a single command.

2. The system according to claim 1, wherein the first peripheral device comprises a processing unit configured to perform at least one operation on at least one item of data among data received from the elements in response to the at least one command.

3. The system according to claim 2, wherein the at least one operation includes at least one of a logic operation, a mathematical operation, a sorting operation, a coding operation, and an aggregation operation.

4. The system according to claim 2, wherein the processing unit is configured to identify the operation according to at least one item of data among data received from the elements in response to the at least one command.

5. The system according to claim 1, wherein at least one of the elements comprises a central memory of the system.

6. The system according to claim 1, wherein the controller of the second peripheral device is further configured to compare an identifier of the sender of the command with at least one predetermined identifier.

7. The system according to claim 1, wherein the controller of the second peripheral device is further configured to perform at least one operation on at least one item of received data.

8. The system according to claim 1, wherein the first peripheral device comprises a processing unit configured to identify the second peripheral device and to send a command for direct access to an area of a memory of the second peripheral device.

9. A computer system comprising a plurality of peripheral devices and at least one switch connected to each device of the plurality of peripheral devices, the switch comprising means for transferring a command to a plurality of elements of the computer system, the plurality of elements comprising at least the peripheral devices, the computer system comprising:
a first peripheral device of the plurality of peripheral devices, comprising means for initiating at least one command for direct access to a plurality of memory areas, each of the memory areas being associated with a distinct element of the plurality of elements,
wherein the switch comprises means for sending at least a part of the at least one command to each element of the plurality of elements,
wherein at least one element of the plurality of elements consists of a second peripheral device of the plurality of peripheral devices, the second peripheral device comprising:
means for receiving at least one command for direct access to an area of a memory of the second peripheral device, the command being received from the at least a first peripheral device via the switch,
means for sending the at least one received direct access command to a component of the second peripheral device, the system enabling the first peripheral device to perform a direct transfer of at least one item of data to or from a memory of the first peripheral device from or to each element of the plurality of elements, except from or to the first peripheral device, on the basis of a single command,
means for checking the validity of the at least one part of the at least one command, and wherein the checking means comprises means for comparing the area of a memory of the second peripheral device with at least one predetermined memory, area.

10. The system according to the claim 9, wherein the first peripheral device comprises means for performing at least one operation on at least one item of data among data received from the plurality of elements in response to the at least one command.

11. The system according to the claim 10, wherein the at least one operation comprises at least one operation among logic operations, mathematical operations, sorting operations, coding operations and aggregation operations.

12. The system according to claim 10, wherein the means for performing the at least one operation comprises means for identifying the at least one operation according to at least one item of data among data received from the plurality of elements in response to the at least one command.

13. The system according to claim 9, wherein at least one element of the plurality of elements comprises a central memory of the computer system.

14. The system according to the claim 9, wherein the checking means comprises means for comparing an identifier of the sender of the at least one direct access command with at least one predetermined identifier.

15. The system according to claim 9, wherein the means of the at least one second device for sending the at least one direct access command to a component of the second peripheral device comprises means for performing at least one operation on at least one item of data received.

16. The system according to claim 9, wherein the first peripheral device further comprises means for identifying the second peripheral device and means for sending a command for direct access to an area of a memory of the second device when the memory concerned by the direct access command coming from the initiating means belong to the at least one second peripheral device.

* * * * *